(12) United States Patent
Reichert et al.

(10) Patent No.: US 6,854,782 B2
(45) Date of Patent: Feb. 15, 2005

(54) SEAT POSITION SENSING DEVICE FOR USE IN OCCUPANT RESTRAINT

(75) Inventors: Adam Reichert, Novi, MI (US); John F. Nathan, White Lake Twp, MI (US); John R. Sims, South Lyon, MI (US); David Anthony Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,268

(22) Filed: Jan. 3, 2003

(65) Prior Publication Data

US 2004/0130176 A1 Jul. 8, 2004

(51) Int. Cl.[7] ............................................... B60N 2/02
(52) U.S. Cl. ............... 296/65.13; 280/735; 296/65.14; 296/68.1
(58) Field of Search .................... 296/65.13, 65.14, 296/68.1; 297/216.11; 318/286; 280/735, 734; 248/430; 340/572.1, 425.5

(56) References Cited

U.S. PATENT DOCUMENTS

| | | | | |
|---|---|---|---|---|
| 5,407,166 A | * | 4/1995 | Pilarski | 296/65.14 |
| 5,481,078 A | * | 1/1996 | Asche | 200/85 A |
| 5,542,493 A | | 8/1996 | Jacobson et al. | 180/272 |
| 5,570,903 A | | 11/1996 | Meister et al. | 280/735 |
| 5,653,501 A | * | 8/1997 | Goor | 297/216.11 |
| 5,670,853 A | * | 9/1997 | Bauer | 318/286 |
| 5,751,129 A | | 5/1998 | Vergin | 318/467 |
| 5,785,347 A | * | 7/1998 | Adolph et al. | 280/735 |
| 5,803,491 A | * | 9/1998 | Barnes et al. | 296/68.1 |
| 5,831,342 A | | 11/1998 | Vivacqua et al. | 307/10.1 |
| 5,877,677 A | * | 3/1999 | Fleming et al. | 280/735 |
| 5,893,582 A | * | 4/1999 | Allen et al. | 280/735 |
| 5,906,393 A | * | 5/1999 | Mazur et al. | 280/735 |
| 5,941,495 A | * | 8/1999 | Bauer et al. | 248/430 |
| 5,967,549 A | * | 10/1999 | Allen et al. | 280/735 |
| 6,053,529 A | * | 4/2000 | Frusti et al. | 296/65.13 |
| 6,095,555 A | * | 8/2000 | Becker et al. | 280/735 |
| 6,129,168 A | * | 10/2000 | Lotito et al. | 280/735 |
| 6,234,520 B1 | * | 5/2001 | Breed et al. | 280/735 |
| 6,275,026 B1 | | 8/2001 | Becker | 324/207.2 |
| 6,323,444 B1 | * | 11/2001 | Aoki | 280/735 |
| RE37,466 E | | 12/2001 | Allen et al. | 280/735 |
| 6,422,595 B1 | | 7/2002 | Breed et al. | 280/735 |
| 6,457,545 B1 | * | 10/2002 | Michaud et al. | 280/735 |
| 6,464,194 B1 | * | 10/2002 | Armo | 248/430 |
| 6,552,662 B1 | * | 4/2003 | Bomya et al. | 340/572.1 |
| 6,648,092 B2 | * | 11/2003 | Michaud et al. | 280/735 |
| 6,684,141 B2 | * | 1/2004 | Koors | 280/734 |
| 2001/0025214 A1 | | 9/2001 | Isonaga et al. | 701/45 |
| 2002/0036400 A1 | | 3/2002 | Winters et al. | 280/743.2 |
| 2002/0059840 A1 | | 5/2002 | Houston et al. | 73/862.474 |
| 2002/0074785 A1 | | 6/2002 | Levine | 280/735 |
| 2002/0147535 A1 | * | 10/2002 | Nikolov | 340/425.5 |

FOREIGN PATENT DOCUMENTS

WO        WO 99/29538 A1       6/1999

* cited by examiner

*Primary Examiner*—Kiran Patel
(74) *Attorney, Agent, or Firm*—Bill C Panagos

(57) ABSTRACT

A seat position sensing device for use in a deployable passenger restraint system for an automotive vehicle has a Hall Effect sensor and a magnetic actuator sensor target facing each other and mounted in corresponding rails used to mount the vehicle seat to the vehicle said rails in moveable relationship to each other. Said seat position sensing device not requiring special hardware to be mounted in external to said seat rails.

10 Claims, 3 Drawing Sheets

SEAT POSITION SENSING DEVICE FOR USE IN OCCUPANT RESTRAINT

BACKGROUND OF INVENTION

1. Field of the Invention

The present invention generally relates to a control system which detects the position of a vehicle seat and uses this information to control the operation of vehicle occupant restraint devices, such as an airbag, depending upon the position of the seat relative to a selected vehicle component, such as a vehicle occupant restraint device.

2. Description of the Related Art

Injuries in motor vehicle accidents have been substantially reduced through the use of vehicle occupant restraint devices. When a motor vehicle is subjected to a sudden deceleration of a predetermined value, vehicle occupant restraint devices are activated to cushion the occupants, and restrain their movement with respect to the vehicle structure. The term "vehicle occupant" is understood to include the driver of a vehicle as well as passengers. The term "vehicle occupant restraint device" is understood to include, airbags stored, for example, in the steering wheel or instrument panel of a vehicle; seat belts and related devices such as pretensioners; side curtains; and other devices which retain a vehicle occupant from impacting with the vehicle structure in the event of a crash.

U.S. Published Application No. 20020074785 teaches a method of maintaining a safe distance between an vehicle air bag and a vehicle passenger by first limiting the travel of the passenger seat and secondly by providing for a means of moving at least one foot petal toward and away from the seated passenger to allow for safe operation of said foot petal while maintaining the passenger a safe distance from said air bag.

U.S. Published Application No. 20020059840 teaches a sensing device to sense when a vehicle seat is occupied by a passenger. The determination of a seat without an occupant allows for the airbag or other restraint system for that seat to be deactivated. The sensing device requires the use of at least one strain gauge mounted on an arm attached to the seat it is monitoring.

U.S. Published Application No. 20020036400 teaches an airbag assembly having an adjustable airbag cushion geometry determined by a series of tethers. The airbag cushion geometry tethers being activated by at least one sensor which can be located on the seat mounting assembly.

U.S. Published Application No. 20010025214 teaches a three sensor assembly for detecting the position of an occupant in a vehicle seat. There is disclosed the combination of a seat back sensor, a seat back angle sensor, and a sensor for determining the position of the seat mounted beneath the rotational center of the seat and a plurality of switches mounted on the seat track.

U.S. Pat. No. 6,422,595 teaches an occupant sensing optical sensor array to determine the presence and position of an occupant in a vehicle seat. In addition there is disclosed the optional use of a seat positioning sensor comprising a dedicated sensing seat track assembly mounted to the seat.

U.S. Pat. No. 6,323,444 teaches a seat track mounting assembly having weight sensing apparatus mounted thereon for determining the weight of the occupant of the seat.

U.S. Pat. No. 6,275,026 teaches a seat positioning device comprising a specially designed seat mounting bracket including a magnetic which creates a magnetic field and a moveable lever which changes said magnetic field, said moveable lever being activated by the movement of the seat and changes in said magnetic field caused by the movement of the moveable lever being detected by a Hall Effect device.

U.S. Pat. No. 6,129,168 teaches a weight sensing device for determining the weight of a vehicle seat occupant utilizing a Hall Effect sensor to detect the deflection of the weight sensing device.

U.S. Pat. No. 6,095,555 teaches the use of a Hall Effect sensor mounted within a special seat mounting tack assembly to determine the forward position of a passenger seat in a vehicle.

U.S. Pat. No. 6,053,529 teaches a seat positioning device utilizing a sensor flange externally mounted on the moveable seat track rail and a magnetic sensor mounted externally on the stationary seat track rail.

U.S. Pat. No. 5,831,342 teaches a seat belt retractor sensing device for determining when a seat is occupied by an object other than a forward facing passenger. The invention allows for the disablement of the associated airbag when a rear facing baby seat in mounted in a front passenger seat.

U.S. Pat. No. 5,751,129 teaches a memory module which collects and stores information for a series of seat sensors and utilizes this information to position a vehicle passenger seat to a predetermined position.

U.S. Pat. No. 5,570,903 teaches another sensor system for determining if a front passenger seat contains a rear facing infant seat. In one embodiment a Hall Effect sensor is utilized in the seat cushion area of the passenger seat to make the determination.

U.S. Pat. No. 5,542,493 teaches the use of a Hall Effect sensor to render inoperable the hydraulic devices in heavy equipment when the operator is not seated in the operator seat. Optionally, is taught the use of a Hall Effect sensor in the operator seat of heavy equipment to determine when the operator is in a safe seated position.

U.S. Pat. No. 5,481,078 teaches another operator presence sensor assembly for heavy equipment utilizing leaf springs under the operator seat.

U.S. Pat. No. RE 37,466 teaches a seat positioning sensor assembly utilizing a special rail and sensor mounting assembly in place of the commonly used seat rail assembly.

WO 9929538 teaches a tension sensor assembly for a vehicle seat belt including the use of a Hall Effect sensor.

DISCLOSURE OF THE INVENTION

The present invention provides advantages and alternatives over the prior art by providing a deployable passenger restraint system for an automotive vehicle having an occupant seat mounted on a seat track for adjustable movement in a longitudinal direction, the seat track having a movable rail in slidable relationship with the stationary rail mounted to the vehicle floor. The system includes a deployable restraint mounted in a forward location of the vehicle, a deployment mechanism for deploying the restraint, a deployment restraint processor for receiving and processing restraint deployment signals and for controlling the deployment mechanism, and a seat position sensor having a Hall Effect sensor pointing downward and mounted in the plastic slide normally mounted to the movable rail said plastic slide positioned between said movable rail and the stationary rail, and a sensor target located on the upper surface of the stationary rail positioned so that the Hall Effect sensor senses the presence of the sensor target and relays a signal representative of seat position to the deployment processor.

According to a further aspect of the present invention, the sensor target comprises the ferromagnetic steel of either the stationary rail, or a separate piece of ferromagnetic steel mounted on the upper surface of the stationary rail. When the sensor target comprises the ferromagnetic steel of one of the rails a portion of said rail is shielded from the Hall Effect sensor by a plastic slide piece mounted on one of said rails and sandwiched between the rails mounting the seat to the vehicle.

According to yet another aspect of the present invention the sensor target comprises a magnet mounted on the upper surface of the stationary rail.

According to a yet further aspect of the present invention there is provided a deployable passenger restraint system for an automotive vehicle having an occupant seat mounted on a seat track for adjustable movement in a longitudinal direction, the seat track having a movable rail in slidable relationship with the stationary rail mounted to the vehicle floor. The system includes a deployable restraint mounted in a forward location of the vehicle, a deployment mechanism for deploying the restraint, a deployment restraint processor for receiving and processing restraint deployment signals and for controlling the deployment mechanism, and a seat position sensor having a Hall Effect sensor pointing upward and mounted on the stationary rail, and a sensor target located on the lower surface of the movable rail positioned so that the Hall Effect sensor senses the presence of the sensor target and relays a signal representative of seat position to the deployment processor.

According to still another aspect of the present invention the sensor target comprises the ferromagnetic steel of either the movable rail, or a separate piece of ferromagnetic steel mounted on the lower surface of the movable rail.

According to still yet another aspect of the present invention the sensor target comprises a magnet mounted on the lower surface of the movable rail.

The present invention thus advantageously provides a seat position sensor which is inexpensive, reliable, easy to install and maintain, and requires no additional mechanical assembly be attached to the seat track.

DESCRIPTION OF THE PREFERRED EMBODIMENTS OF THE INVENTION

Figure 1:
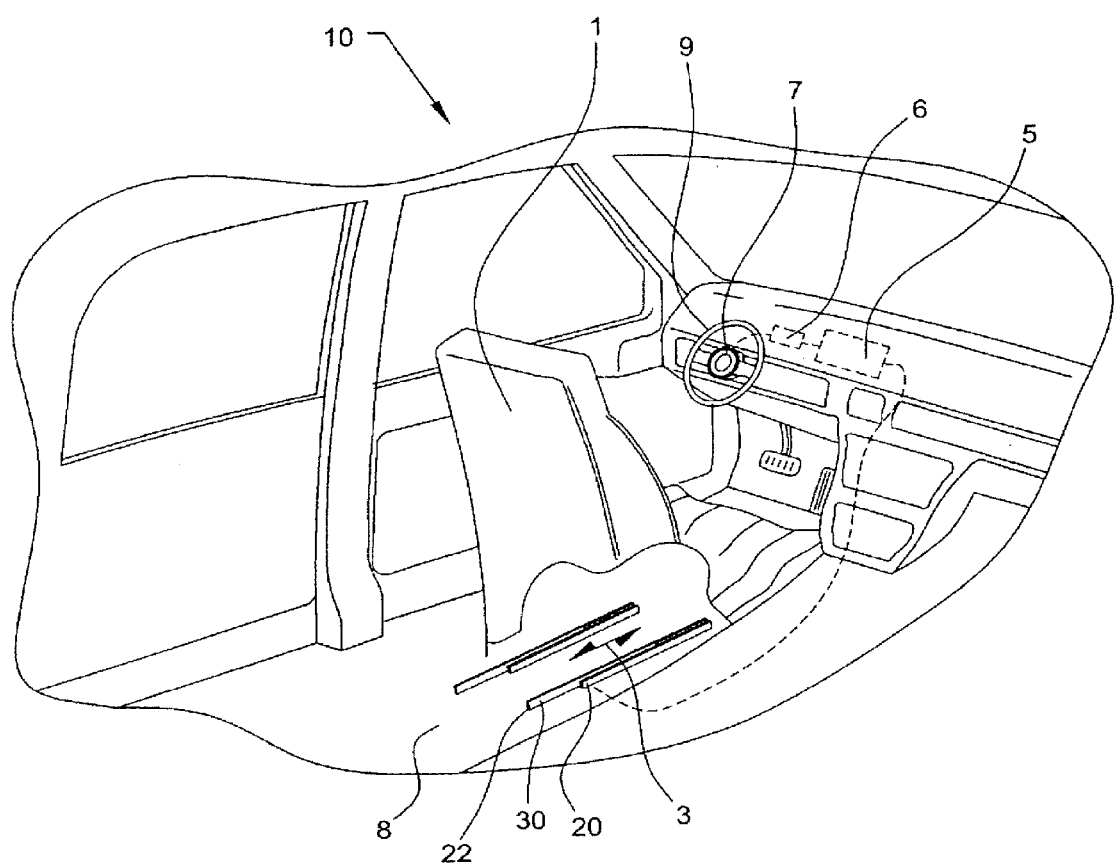
FIG. 1 shows a perspective view of a seat rail assembly of the invention mounted in a motor vehicle and having a passenger seat mounted to a seat track allowing for longitudinal movement of the seat with one embodiment of the present invention mounted on said seat track.

Reference will now be made to the drawings, wherein to the extent possible like reference numerals are utilized to designate like components throughout the various views. Referring to FIG. 1, which presents a perspective view of the driver's compartment of an automotive vehicle 10, the present invention relates to a vehicle occupant restraint device control system which includes a device 22 to detect the position of the seat 1, relative to a selected vehicle component, such as a vehicle occupant restraint device 7, and a means to generate at least one control signal to enable, inhibit and/or impart selected operating characteristics to a vehicle occupant restraint device 7. The vehicle occupant restraint device which is being controlled may be, for example a driver's side airbag module 7 stored in the steering wheel 9. It is understood that the vehicle occupant restraint device control system of the present invention may be used to control other vehicle occupant restraint devices such as side impact airbags, seat belt pretensioners, and the like.

When the control vehicle occupant restraint device system of the present invention senses that a selected component of a vehicle, such as the driver's side airbag module 7, is in a predetermined range of distances from a selected portion of a vehicle seat the controller 5 generates one or more control signals to enable, inhibit and/or impart selected operating characteristics to a vehicle occupant restraint device, such as the front driver's side airbag module 7. As used herein and in the claims the term "airbag module" is understood to mean an assembly comprising at least an airbag and the structure to which the airbag is mounted, but an airbag module may further include an inflation device, and/or airbag cover.

As further shown in FIG. 1 the driver's seat 1 is slidably mounted to the vehicle on a pair of substantially parallel guide rails 20 affixed to the floor 8 of the vehicle driver compartment 10 by a corresponding pair of substantially parallel support rails 30 attached to the lower portion, or bottom of the driver's seat 1 such that the driver's seat is movable (shown by direction of travel arrow 3) relative to the steering wheel 9, and the driver's side airbag module 7 to accommodate drivers of different statures.

As also shown in FIG. 1, the vehicle occupant restraint device control system comprises a seat position sensor device 22 operatively coupled to the driver's side airbag module 7 through an airbag triggering device 6 and a controller 5 to detect the position of a selected portion of the driver's seat 1 relative to a selected vehicle component, such as the driver's side airbag module 7, and to generate a seat position indicator signal when the distance between the selected portion of the driver's seat 1 and the airbag module 7 is within a predetermined range of distances, to enable, inhibit and/or impart selected operating characteristics to a vehicle occupant restraint device, such as the driver's side airbag 7, in the event that a crash of the vehicle.

Figures 2, 3, 4:
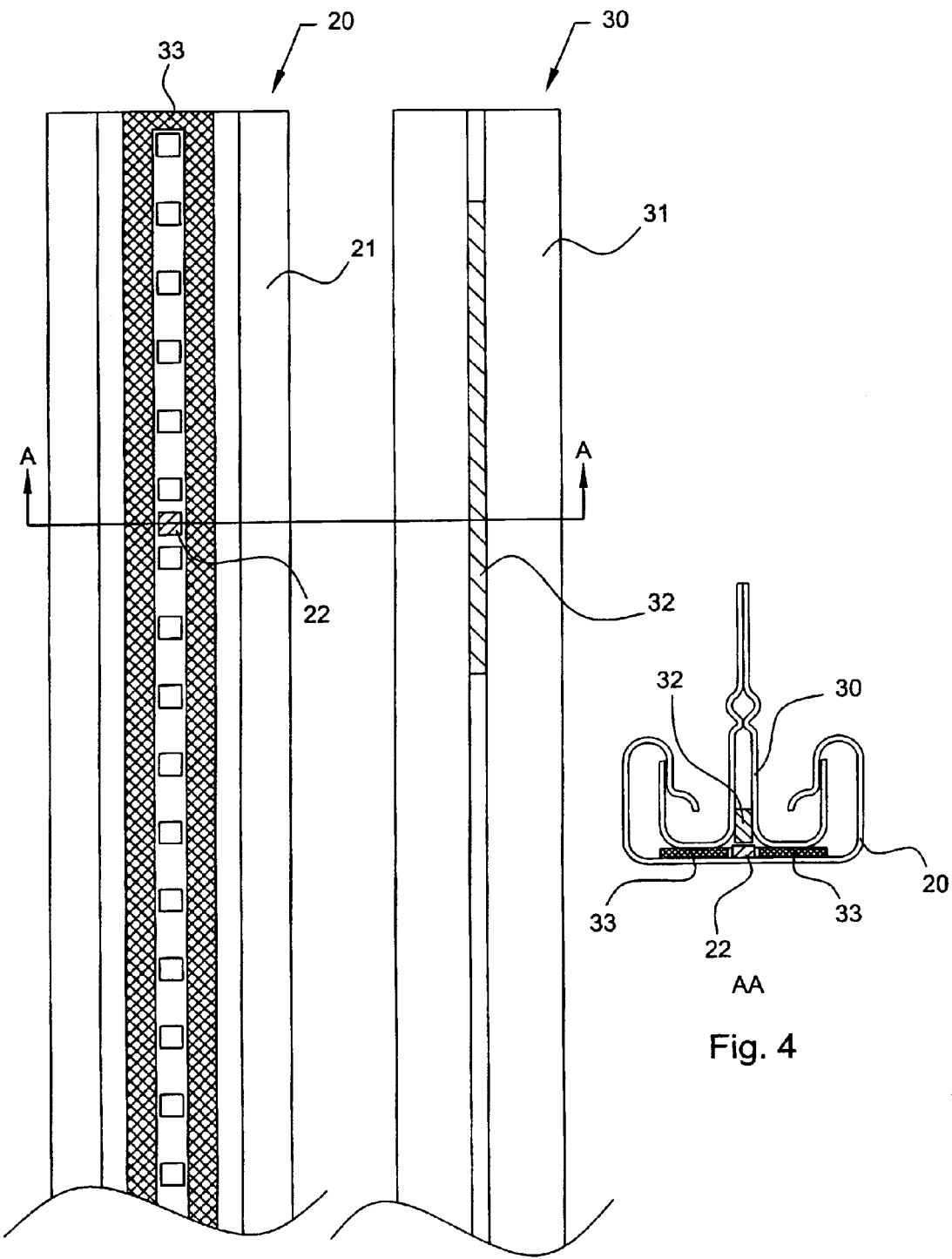
FIG. 2 shows a plan view of the stationary rail of one preferred embodiment of the invention.
FIG. 3 shows a plan view of the movable rail of one preferred embodiment of the invention.
FIG. 4 show a plan end view through section line AA of the assembled movable and stationary rails of one preferred embodiment of the invention.

Referring now to FIGS. 2, 3 and 4, there is shown the seat position sensor assembly of the present invention comprises a magnetic actuator sensor target 32 operatively coupled to a selected portion, in this example the front portion 31 (FIG. 3) of at least one of support rails 30. A Hall Effect sensor 22 which is responsive to a magnetic field is attached to a selected location, in this example the rear portion 21 (FIG. 2), of the corresponding guide rail 20 such that when the driver's seat 1 is moved along the guide tracks the magnetic actuator sensor target 32 is moved relative to the Hall Effect sensor 22 which is responsive to a magnetic field. Also shown is plastic slide 33 which is located between the support rail 30 and guide rail 20 being attached to one of the rails 20, or 30, shown here attached to guide rail 20. The plastic slide 33 provides a bearing surface which allows differential motion between the rails 20 and 30. The plastic slide 33 may be attached using commonly known attaching means, preferably by snapping a tongue on the plastic slide 33 into a corresponding groove in the guide rail 20. The magnetic actuator sensor target 32 and the Hall Effect sensor 22 are mounted such that they are sandwiched between the support rail 30 and the guide rail 20 and further do not physically come in contact with one another. The magnetic actuator sensor target 32 may be a magnet, a magnetic composite material, ferromagnetic steel including the support rail 30 itself, and the like which creates a magnetic field. The Hall Effect sensor 22 comprises a Hall Effect switch which is responsive to a magnetic field when it is moved into operative relationship relative to the magnetic actuator sensor target 32, the Hall Effect sensor 22 generates a seat position indicator signal which is transmitted to the operatively connected to controller 5 (FIG. 1).

Figures 5, 6, 7:
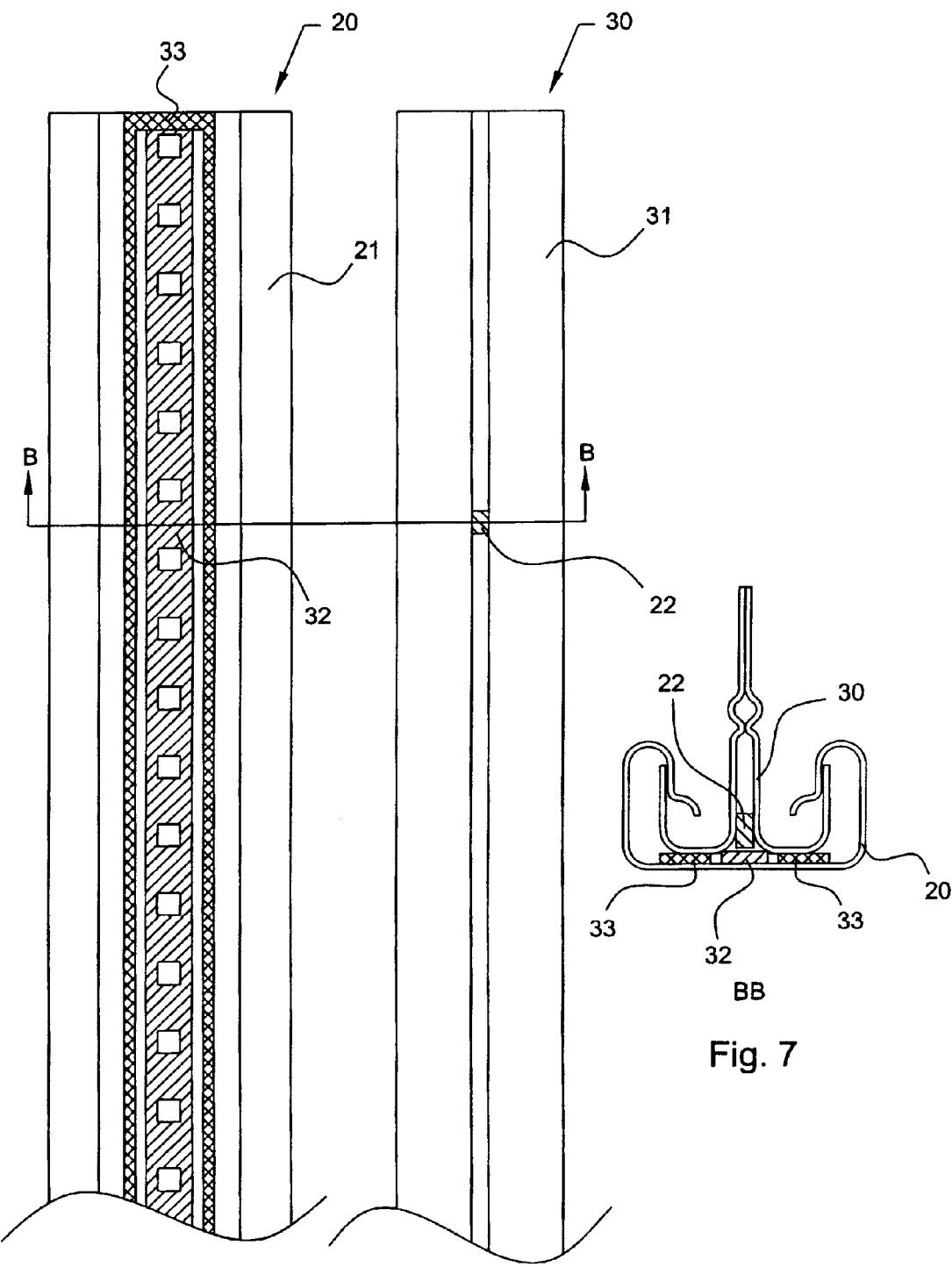
FIG. 5 shows a plan view of the stationary rail of a second preferred embodiment of the invention.
FIG. 6 shows a plan view of the movable rail of a second preferred embodiment of the invention.
FIG. 7 shows a plan end view through section line BB of the assembled movable and stationary rails of a second preferred embodiment of the present invention.

Turning now to FIGS. 5, 6 and 7, there is shown the seat position sensor assembly of the present invention comprises a magnetic actuator sensor target 32 operatively coupled to a selected portion, in this example the front portion 21 (FIG. 5) of at least one of guide rails 20. A Hall Effect sensor 22 which is responsive to a magnetic field is attached to a selected location, in this example the rear portion 31 (FIG. 5), of the corresponding support rail 30 such that when the driver's seat 1 is moved along the guide tracks the Hall Effect sensor 22 which is responsive to a magnetic field is moved relative to the magnetic actuator sensor target 32. The magnetic actuator sensor target 32 and the Hall Effect sensor 22 are mounted such that they are sandwiched between the guide rail 20 and the support rail 30 and further to not physically come in contact with one another Also shown is plastic slide 33 which is located between the support rail 30 and guide rail 20 and attached to one of the rails, shown here attached to guide rail 20, but which may alternatively be attached the support rail 30. The plastic slide 33 provides a bearing surface which allows differential motion between the rails 20 and 30. The plastic slide 33 may be attached using commonly known attaching means, preferably by snapping a tongue on the plastic slide 33 into a corresponding groove in the guide rail 20. The magnetic actuator sensor target 32 may be a magnet, a magnetic composite material, ferromagnetic steel including the guide rail 20 itself, and the like which creates a magnetic field. The Hall Effect sensor 22 comprises a Hall Effect switch which is responsive to a magnetic field when it is moved into operative relationship relative to the magnetic actuator sensor target 32, the Hall Effect sensor 22 generates a seat position indicator signal which is transmitted to the operatively connected to controller 5 (FIG. 1).

As previously set forth, the magnetic actuator sensor target 32 is located on the front portion 31 of at least one of the guide tracks 20, or support tracks 30, such that when the distance between a selected component of the vehicle, such as the driver's side airbag module 7, and a selected portion of a seat 1 such as the driver's backrest, in a predetermined range of values, the Hall Effect sensor 22 which is responsive to a magnetic field is not operatively disposed relative to the magnetic actuator sensor target 32, thereby generating a first seat position indicator signal; when the distance between the driver's side airbag module 7 and the driver's seat 1 backrest is in a predetermined range of distances, the Hall Effect sensor 22 which is responsive to a magnetic filed is disposed in a region that makes the Hall Effect sensor 22 operatively disposed or aligned relative to the magnetic actuator sensor target 32 to generate a second seat position indicator signal that is transmitted to operatively connected controller 5. It is understood that the seat position signals may be the result of an open circuit or closed circuit, or may be signals of varying intensity, frequency or duration.

The controller 5 comprises known circuitry to receive the seat position indicator signal generated by the seat position Hall Effect sensor 22 when distance between the driver's side airbag module 7 and the driver's seat 1 backrest is in a predetermined range of distances, and to generate a control signal transmitted to a vehicle occupant restraint device, such as the driver's side airbag module 7 operatively connected to said Hall Effect sensor 22 and said controller 5 to enable, inhibit and/or impart selected operating characteristics to a vehicle occupant restraint device, such as the driver's side airbag 7.

The front passenger's side (not shown) may be similarly equipped with a vehicle occupant restraint device control system to enable, inhibit and/or impart selected operating characteristics to one or more vehicle occupant restraint devices, such as a front passenger's side airbag, relative to the distance between a selected component of the vehicle and a selected portion of the vehicle front passenger seat.

While the support track 30, and guide track 20, have been described and illustrated as orientated in a horizontal plane it is to be understood that they may alternatively be mounted in a vertical plane without departing from the spirit and scope of the present invention. It is further understood that various known geometries of seat tracks may be used as are well known in the art with the present invention. It is also to be understood that while the slide 33 has been shown mounted in the guide track 20 as a flat piece it may have other shapes and forms to fit particular track geometry and also may alternatively be attached to the support track 30.

It should be understood that only one Hall Effect switch need be used in order to determine the position of a seat with respect to two seat zones. In addition, more than two Hall Effect switches may be used to identify a greater number of seat zones than shown in FIGS. 2–7, which define two seat zones.

One particularly preferred embodiment of the present invention provides for a deployable passenger restraint system for an automotive vehicle comprising an occupant seat 1, mounted on a substantially parallel pair of seat tracks for adjustable movement in at least a longitudinal direction 3, each seat tracks comprising a stationary guide rail 20 mounted to the vehicle floor 8 having a plastic slide 33 attached thereto, attached in a slidable relationship with a movable support rail 30; a deployable restraint 7; a deployable mechanism 6 for deploying the restraint 7; a deployable restraint processor means 5 for receiving and processing a plurality of restraint deployment signals and for controlling the deployment mechanism 6; and a seat position sensor comprising a pair of stationary guide rails 20 each having a plastic slide 33 mounted thereon; a Hall Effect sensor 22 mounted on at least one of said plastic slides 33 mounted on said guide rails 20 for sensing the presence of a magnetic sensor target 32 and relaying a signal representative of seat position to the deployable restraint processor means 5, and said Hall Effect sensor 22 pointing upward toward; a magnetic sensor target 32 mounted along a predetermined length of at least one of said support rails 30 corresponding to the guide rail 20 having the Hall Effect sensor 22 mounted thereon, and pointing downward toward said Hall Effect sensor 22, said stationary guide rail 20 fixedly mounted to the automotive vehicle.

Another particularly preferred embodiment of the present invention provides for a deployable passenger restraint system for an automotive vehicle comprising: an occupant seat, mounted on a substantially parallel pair of seat tracks for adjustable movement in at least a longitudinal direction 3, each seat tracks comprising a stationary guide rail 20 mounted to the vehicle floor 8 and having a plastic slide 33 attached thereto, attached in a slidable relationship with a moveable support rail 30; a deployable restraint 7; a deployable mechanism 6 for deploying the restraint 7; a deployable restraint processor means 5 for receiving and processing a plurality of restraint deployment signals and for controlling the deployment mechanism 6; and a seat position sensor comprising a pair of stationary guide rails 20 fixedly attached to the vehicle floor 8; a magnetic sensor target 32 mounted along a predetermined length of at least one of said stationary rails 20 pointing upward toward; a Hall Effect sensor 22 mounted on at least one of said plastic slides 33 mounted in said moveable support rails 30 for sensing the presence of a magnetic sensor target 32 and relaying a signal representative of seat position to the deployable restraint processor means 5, and said Hall Effect sensor 22 pointing downward toward said magnetic sensor target 32 mounted on said corresponding stationary guide rail 20. Most preferably having said magnetic sensor target 32 located on the forward ⅔ of said plastic slide 33 attached to said guide rail 20 and said Hall Effect sensor 22 mounted on the support rail 30 and pointing toward the plastic slide 33.

While the preferred embodiments of the present invention contemplate the use of a Hall Effect sensor, other types of sensors are suitable for use in the present invention including, for example, optical, contact sensing, other forms of magnetic and electro magnetic sensors as are well known in the art.

Although the preferred embodiments of the present invention has been disclosed, various changes and modifications may be made without departing from the scope of the invention as set forth in the appended claims.

What is claimed is:

1. A deployable passenger restraint system for an automotive vehicle comprising:

an occupant seat 1, mounted on a substantially parallel pair of seat tracks for adjustable movement in at least a longitudinal direction 3, each seat tracks comprising a stationary guide rail 20 mounted to the vehicle floor 8, having a plastic slide 33 attached thereto, attached in a slidable relationship with a moveable support rail 30;

a deployable restraint 7;

a deployable mechanism 6 for deploying the restraint 7;

a deployable restraint processor means 5 for receiving and processing a plurality of restraint deployment signals and for controlling the deployment mechanism 6; and a seat position sensor comprising:

a pair of stationary guide rails 20 each having a plastic slide 33 mounted thereon;

a Hall Effect sensor 22 mounted on at least one of said plastic slides 33 mounted on said guide rails 20 for sensing the presence of a magnetic sensor target 32 and relaying a signal representative of seat position to the deployable restraint processor means 5, and said Hall Effect sensor 22 pointing upward toward;

a magnetic sensor target 32 mounted along a predetermined length of at least one of said support rails 30 corresponding to the guide rail 20 having the Hall Effect sensor 22 mounted thereon, and pointing downward toward said Hall Effect sensor 22, said stationary guide rail 20 fixedly mounted to the automotive vehicle.

2. The deployable passenger restraint system as claimed in claim 1 wherein, the magnetic sensor target 32 is mounted on the front end of said support rail 30 and extends toward the middle of the support rail 30.

3. The deployable passenger restraint system as claimed in claim 1 wherein, the predetermined length represents that seat travel distance placing the occupant closer than eight inches from the deployable restraint 7.

4. The deployable passenger restraint system as claimed in claim 1 wherein, there is a single Hall Effect sensor 22 and corresponding magnetic sensor target 32 mounted on a single seat track.

5. The deployable passenger restraint system as claimed in claim 1 wherein, there is more than one Hall Effect sensor 22 and one corresponding magnetic sensor target 32 mounted on a single seat track.

6. The deployable passenger restraint system as claimed in claim 1 wherein, said magnetic sensor target 32 is the ferromagnetic metal of said support rail 30.

7. The deployable passenger restraint system as claimed in claim 1 wherein, said magnetic sensor target 32 is a magnet.

8. The deployable passenger restraint system as claimed in claim 1 wherein, said magnetic sensor target 32 is a magnetic field creating composition.

9. The deployable passenger restraint system as claimed in claim 1 wherein, said substantially parallel pair of seat tracks is mounted in a substantially horizontal position.

10. The deployable passenger restraint system as claimed in claim 1 wherein, said substantially parallel pair of seat tracks is mounted in a substantially vertical position.

* * * * *